US011122281B2

(12) United States Patent
Taubman et al.

(10) Patent No.: US 11,122,281 B2
(45) Date of Patent: Sep. 14, 2021

(54) BASE ANCHORED MODELS AND INFERENCE FOR THE COMPRESSION AND UPSAMPLING OF VIDEO AND MULTIVIEW IMAGERY

(71) Applicant: KAKADU R & D PTY LTD, Redfern (AU)

(72) Inventors: David Scott Taubman, Redfern (AU); Dominic Patric Ruefenacht, Randwick (AU)

(73) Assignee: KAKADU R&D PTY LTD., New South Wales (AU)

( * ) Notice: Subject to any disclaimer, the term of this patent is extended or adjusted under 35 U.S.C. 154(b) by 0 days.

(21) Appl. No.: 16/335,297

(22) PCT Filed: Sep. 21, 2017

(86) PCT No.: PCT/AU2017/051030
§ 371 (c)(1),
(2) Date: Mar. 21, 2019

(87) PCT Pub. No.: WO2018/053591
PCT Pub. Date: Mar. 29, 2018

(65) Prior Publication Data
US 2020/0021824 A1    Jan. 16, 2020

(30) Foreign Application Priority Data

Sep. 21, 2016    (AU) ............................ 2016903815
Jul. 7, 2017    (AU) ............................ 2017902670

(51) Int. Cl.
*H04B 1/66*    (2006.01)
*H04N 7/12*    (2006.01)
(Continued)

(52) U.S. Cl.
CPC ........... *H04N 19/31* (2014.11); *H04N 19/172* (2014.11); *H04N 19/177* (2014.11); *H04N 19/54* (2014.11); *H04N 19/597* (2014.11)

(58) Field of Classification Search
CPC ............................... G06T 9/001; H04N 19/54
See application file for complete search history.

(56) References Cited

U.S. PATENT DOCUMENTS

2006/0114995 A1   6/2006   Robey et al.
2006/0239345 A1*   10/2006   Taubman ............... H04N 19/46
                                                 375/240.03
(Continued)

FOREIGN PATENT DOCUMENTS

AU    2016903815    9/2016
AU    2017902670    7/2017
(Continued)

OTHER PUBLICATIONS

Rüfenacht et al."Occlusion-aware temporal frame interpolation in a highly scalable video coding setting." APSIPA Transactions on Signal and Information Processing 5 (Apr. 1, 2016) (Year: 2016).*
(Continued)

Primary Examiner — Fabio S Lima
(74) Attorney, Agent, or Firm — Ballard Spahr LLP

(57) ABSTRACT

A method of representing displacement information between the frames of a video and/or multiview sequence, comprising the steps of assigning a plurality of the frames to a Group of Pictures (GOPs), providing a base displacement model for each GOP, the base displacement model describing a displacement field that carries each location in a designated base frame of the GOP to a corresponding location in each other the frame of the GOP, and inferring other displacement relationships between the frames of the GOP from the base displacement model. Embodiments include a piecewise smooth displacement field, deformable mesh, reverse dis-
(Continued)

placement field, double mapping, synthesize optical blur and foreground-background discrimination process.

18 Claims, 6 Drawing Sheets

(51) Int. Cl.
| | |
|---|---|
| *H04N 11/02* | (2006.01) |
| *H04N 11/04* | (2006.01) |
| *H04N 19/31* | (2014.01) |
| *H04N 19/172* | (2014.01) |
| *H04N 19/177* | (2014.01) |
| *H04N 19/54* | (2014.01) |
| *H04N 19/597* | (2014.01) |

(56) References Cited

U.S. PATENT DOCUMENTS

| | | | |
|---|---|---|---|
| 2007/0025448 A1* | 2/2007 | Cha | H04N 19/86 375/240.24 |
| 2009/0256918 A1* | 10/2009 | Rabinowitz | G02B 27/646 348/208.4 |
| 2010/0316126 A1 | 12/2010 | Chen et al. | |
| 2015/0078435 A1* | 3/2015 | Taubman | G06T 9/00 375/240.02 |
| 2015/0195525 A1* | 7/2015 | Sullivan | H04N 19/136 375/240.02 |

FOREIGN PATENT DOCUMENTS

| | | |
|---|---|---|
| EP | 0782343 A3 | 12/2000 |
| WO | WO-2004/028166 A1 | 4/2004 |
| WO | PCT/AU2017/051030 | 9/2017 |

OTHER PUBLICATIONS

Andreopoulos, Y. et al., In-band motion compensated temporal filtering. Signal Process Image Commun. 2004; 19(7):653-73.
Chang, C.-L. et al., Light field compression using disparity-compensated lifting and shape adaptation. IEEE Trans Image Process. 2006; 15(4):793-806.
Choi, B.-D. et al., Motion-compensated frame interpolation using bilateral motion estimation and adaptive overlapped block motion compensation. IEEE Trans Circ Sys Video Technol. 2007; 17(4):407-16.
Daribo, I. et al., Arbitrarily shaped sub-block motion prediction in texture map compression using depth information. Picture Coding Symposium (PCS). May 2012; pp. 121-124.
Flierl, M. and Girod, B., Video coding with motion-compensated lifted wavelet transforms. Signal process: Image Commun. 2004; 19:561-75 (34 pages).
Garbas, J.-U. et al., Methods and tools for wavelet-based scalable multiview video coding. IEEE Trans Circ Syst Video Technol. 2011; 21(2):113-26.
Golbelkar, A. and Woods, J., Motion-compensated temporal filtering and motion vector coding using biorthogonal filters, IEEE Trans Circ Syst Video Technol. 2007; 17(4):417-28.
Jeong, S.-G. et al., Motion-compensated frame interpolation based on multihypothesis motion estimation and texture optimization. IEEE Trans Image Process. 2013; 22(11):4495-509.
Kim, D. et al., Iterative true motion estimation for motion-compensated frame interpolation. IEEE Trans Circ Syst Video Technol. 2013; 23(3):445-54.
Lalgudi, H.G. et al., View compensated compression of volume rendered images for remote visualization. IEEE Trans Image Process. 2009; 18(7):1501-11.
Mathew, R. and Taubman, D., Scalable modeling of motion and boundary geometry with quad-tree node merging. IEEE Trans Circ Syst Video Technol. 2011; 21(2):178-92.

Mathew, R. et al., Scalable coding of depth maps with R-D optimized embedding. IEEE Trans Image Process. 2013; 22(5):1982-95.
Mathew, R. et al., Optimization of Optical Flow for Scalable Coding. Picture Coding Symposium (PCS). May 31 to Jun. 3, 2015. pp. 70-74.
Mehrseresht, N. and Taubman, D., An efficient content-adaptive motion-compensated 3-D DWT with enhanced spatial and temporal scalability. IEEE Trans Image Process. 2006; 15(3):1397-412.
Milani, S. and Calvagno, G., Segmentation-based motion compensation for enhanced video coding. IEEE Int Conf Image Process. 2011; 1685-8.
Naman, A.T. and Taubman, D., Flexible synthesis of video frames based on motion hints. IEEE Trans Image Process. 2014; 23(9):3802-15.
Ottaviano, G. and Kohli, P., Compressible motion fields. Proc IEEE Conf Comput Vision Pattern Recog (CVPR). Jun. 2013. pp. 2251-2258.
Revaud, J. et al., Epicflow: edge-preserving interpolation of correspondences for optical flow. Proc IEEE Conf Comput Vision Pattern Recog (CVPR), Jun. 2015 (9 pages).
Rufenacht, D. et al., A Novel Motion Field Anchoring Paradigm for Highly Scalable Wavelet-Based Videa Coding. IEEE Trans Image Process. 2016; 25(1):39-52.
Rufenacht, D. et al., Bidirectional Hierarchical Anchoring of Motion Fields for Scalable Video Coding. 2014 IEEE 16th International Workshop on Multimedia Signal Processing (MMSP). Sep. 22-24, 2014 (6 pages).
Rufenacht, D. et al., Bidirectional, occlusion-aware temporal frame interpolation in a highly scalable video setting. Picture Coding Symposium (PCS). May 2015. pp. 5-9.
Secker, A. and Taubman, D., Lifting-based invertible motion adaptive transform (LIMAT) framework for highly scalable video compression. IEEE Trans Image Process. 2003; 12(12):1530-42 (35 pages).
Sun, D. et al., A fully connected layered model of foreground and background flow. IEEE Conf Comput Vision Pattern Recog (CVPR). 2013; pp. 2451-2458.
Szeliski, R. and Shum, H.-Y., Motion estimation with quadtree splines. IEEE Trans Pattern Anal Machine Intelligence. 1996; 18(12):1199-210 (36 pages).
Taubman, D., High performance scalable image compression with EBCOT. Proc 1999 Int Conf Image Process. 1999; 344-8.
Young, S. and Taubman, D., Rate-distortion optimized optical flow estimation. IEEE Int Conf Image Process. Sep. 2015. pp. 1677-1681.
Zheng, A. et al., Motion vector fields based video coding. IEEE Int Conf Image Process. Septembre 2015. pp. 2095-2099.
International Search Report and Written Opinion dated Dec. 18, 2017 by the International Searching Authority for Patent Application No. PCT/AU2017/051030, which was filed on Sep. 21, 2017 and published as WO 2018/053591 on Mar. 29, 2018 (Inventor—Taubman et al.; Applicant—Kakadu R & D Pty, Ltd.) (9 pages).
International Preliminary Report on Patentability dated Jan. 21, 2019 by the International Searching Authority for Patent Application No. PCT/AU2017/051030, which was filed on Sep. 21, 2017 and published as WO 2018/053591 on Mar. 29, 2018 (Inventor—Taubman et al.; Applicant—Kakadu R & D Pty, Ltd.) (12 pages).
Rufenacht, D. et al., "Occlusion-aware temporal frame interpolation in a highly scalable video coding setting," SIP, 2016, vol. 5.
Rufenacht, D. et al., "Temporally Consistent High Frame-Rate Upsampling with Motion Sparsification," 2016 IEEE 18th International Workshop on Multimedia Signal Processing, Sep. 21-23, 2016, pp. 1-6.
Woods, J.W., "Digital Video Compression," Multidimensional Signal, Image, and Video Processing and Coding, 2012, pp. 467-528, Elsevier.
Ypsilos, I.A., "Capture and Modelling of 3D Face Dynamics," Center for Vision, Speech and Signal Processing, 2004.
Supplementary European Search Report issued in related application EP17851993 dated Mar. 10, 2020.

* cited by examiner

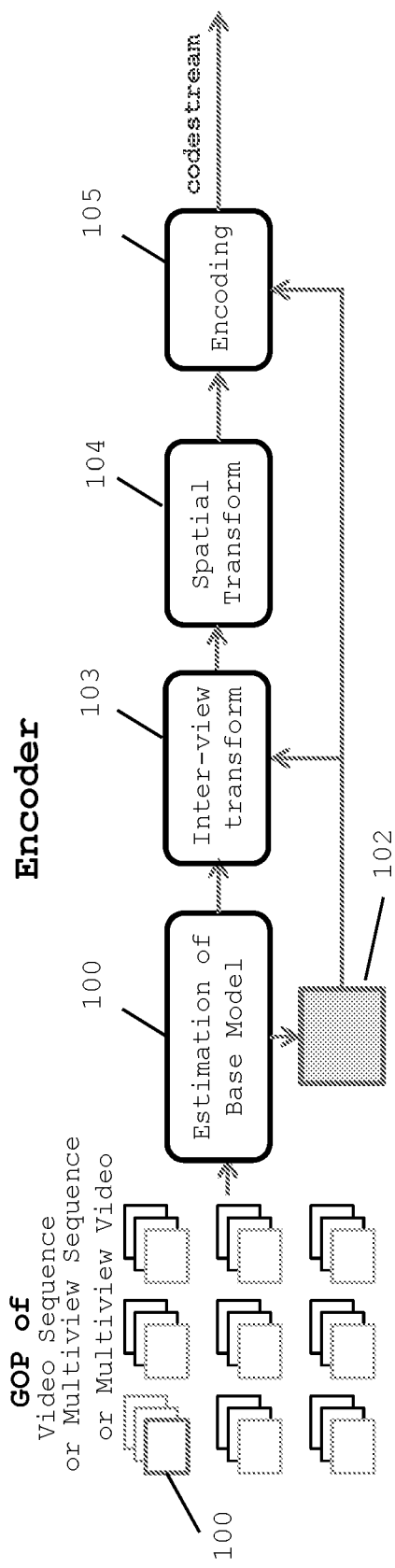
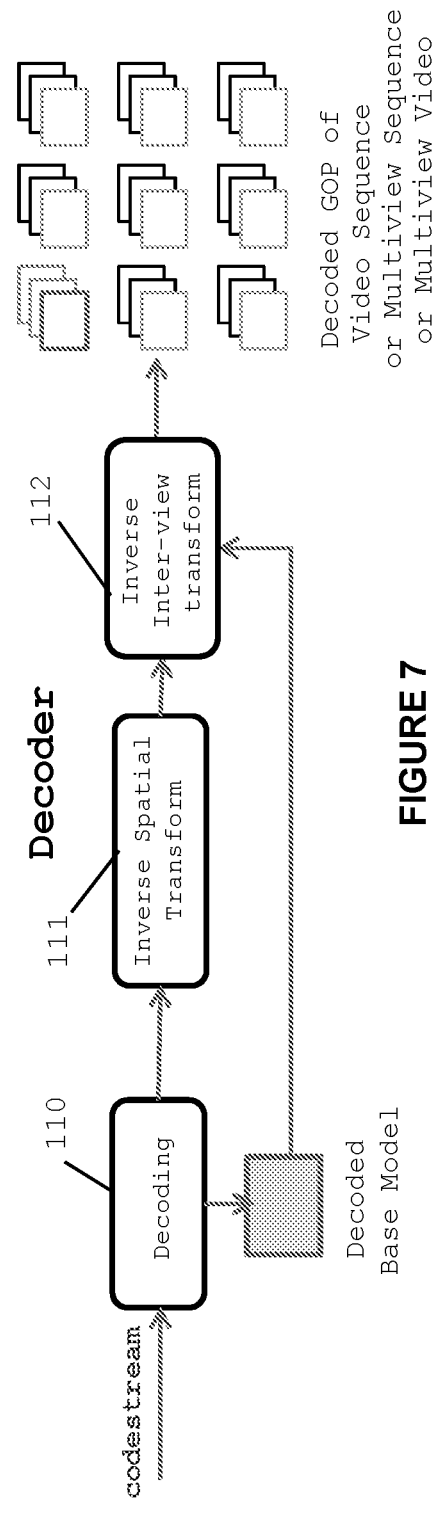
FIGURE 6
FIGURE 7

BASE ANCHORED MODELS AND INFERENCE FOR THE COMPRESSION AND UPSAMPLING OF VIDEO AND MULTIVIEW IMAGERY

CROSS REFERENCE TO RELATED APPLICATIONS

This application is a U.S. National Phase Application of International Application No. PCT/AU2017/051030, filed Sep. 21, 2017, which claims priority to AU 2016903815, filed Sep. 21, 2016, and AU 2017902670, filed Jul. 7, 2017, all of which applications are hereby incorporated by reference in their entireties.

1 FIELD OF THE INVENTION

The present invention relates to an apparatus and a method for coding a video signal, and particularly, but not exclusively, to a method and an apparatus for implementing a representation of displacement information (i.e., a model) between video frames.

BACKGROUND

Hereinafter, we use the term "frame" to refer to frames of a video sequence, as well as views in a multi-view setting. Embodiments of the invention are not concerned with the generation of such models, but how they can be used to "infer" frames in between already decoded frames.

This application is associated with the applicant's earlier Australian Provisional Patent Application numbers 2016903815 and 2017902670, the contents of which are incorporated herein by reference.

The evolution of existing video coders has been strongly driven by innovations in motion modeling. However, this motion is invariably described from the perspective of the predicted target frames; that is, the motion vectors are attached to the frames that are being predicted, pointing to the prediction source locations in other frames. This approach seems natural, but it severely hampers the temporal reasoning required to discover foreground/background relationships for accurate inversion and composition of motion fields across time.

In the conventional approach, motion is described using blocks with artificial boundaries, leading to piecewise constant motion fields that are unlikely to reflect true scene motion. These descriptions are often redundant, with more individual motion fields than video frames; hierarchical bi-directional prediction, for example, uses 2 motion fields per video frame. Temporal relationships that should be satisfied by physical motion are then largely ignored. In place of temporal motion reasoning, existing video coders present a huge array of explicitly coded block modes, over which exhaustive or heuristic optimisation is performed. Not surprisingly, this leads to opportunistic motion descriptions that serve the purpose of predicting the target frame, but are not generally physical or temporally consistent.

As further evidence of these weaknesses, we note that high performance temporal frame interpolation algorithms (required for frame rate upsampling in displays) need to estimate motion directly from decoded video, rather than relying upon the motion vectors available from the decoded bit-stream—see references [1] [2] [3], for important examples of this consistent trend.

The introduction of motion compensated temporal lifting transforms [4] (also known as motion compensated temporal filtering, or just MCTF) significantly raised interest in scalable video coding, e.g. [5] [6] [7]. At the same time, it became apparent that similar methods could be used to build transforms for the compression of multi-view content, where the term disparity-compensated lifting is used in place of motion-compensated lifting [8]. Building on these works, related methods have been proposed to compress multi-view video [9] [10].

Many of the solutions proposed for the first international scalable video coding standard (SVC) incorporated motion compensated temporal lifting. However, the outcomes from this effort and the more recent scalable H.265/HEVC extensions have been founded on the block-based target-frame centric approach, adding inter-layer prediction modes and additional reference frames. These standard tools largely negate the benefits of temporal lifting. A major reason for the lack of any fundamental shift in video coding technology is the inadequacy of existing motion models.

Recent progress in motion for video coding has been shifting to methods that are better able to account for motion boundaries references [11] [12] [13], for example, are just some of a number of works that demonstrate the benefits of partitioning motion fields based on motion discontinuities. There has also been growing interest in the use of optical flow fields for video compression, e.g. [14] [15]. Nonetheless these methods continue to describe motion at the target frames; an exception is the motion hints approach that was pioneered by Taubman and Naman [16].

Recently, the Applicants have shown that anchoring motion at the reference frames is fundamentally superior to the ubiquitous target-anchored approach, demonstrating improvements in compression performance in a fair setting [17], along with inherent advantages for temporal frame interpolation [18]—a common component in modern entertainment systems. This approach, known as "bi-directional hierarchical anchoring of motion," uses temporal motion reasoning to invert and compose piecewise smooth motion fields. This approach can lead to sparse motion fields and represents important progress.

2 SUMMARY

In accordance with a first aspect, the present invention provides a method of representing displacement information between the frames of a video and/or multiview sequence, comprising the steps of assigning a plurality of the frames to a Group of Pictures (GOP), providing a base displacement model for each GOP, the base displacement model describing a displacement field that carries each location in a designated base frame of the GOP to a corresponding location in each other the frame of the GOP, and inferring other displacement relationships between the frames of the GOP from the base displacement model.

In an embodiment, a video signal may be a multi-view video signal. In an embodiment, a GOP may consist of frames from multiple views at the same time instance and/or frames from a view taken at different time instances.

In an embodiment, the video signal may be a single dimensional video sequence.

A GOP need not be one-dimensional, as is traditionally the case for single view video compression, or in the case of a multi-view arrangement where all views are arranged in a 1D array. 2D groups of pictures are the most appropriate construct for multi-view imagery associated with a 2D array of cameras, while 3D GOPs are the most appropriate construct when the cameras in such an array each capture a video sequence.

In this specification, the term "displacement" covers a number of parameters associated with the images, including motion, depth and disparity (particularly for multi-view imagery and video), location information, and other parameters.

In an embodiment, this represents a new way to describe, compress and infer displacements, in which all displacement information for a group of pictures (GOP) is derived from a base model, whose displacement representations are anchored at the GOP's base frame. We refer to this as base-anchored, in contrast to both the usual target-anchored approach employed in all standardized video compression schemes and our own recent work on hierarchical anchoring at reference frames. This approach has fundamental advantages over all the methods mentioned above.

In an embodiment of this base-anchored approach, one piecewise smooth 2D displacement field is encoded for each frame, but all of the displacement fields associated with a GOP are anchored at its base frame. Collectively, we identify these displacement fields as the base model. One advantage of anchoring all descriptions for the GOP at the same frame is that it facilitates various compact descriptions of the multitude of displacement fields. By anchoring all displacements at the base frame, a single description of boundary discontinuities can be applied to all displacement fields, these boundary discontinuities being critical to the description of piecewise continuous models in general. In addition, energy compacting transforms are readily applied directly to the collection of displacement fields. In some embodiments, parametric models may be employed to express the base model using a reduced set of displacement parameters. For video, where displacement between frames is related to motion, parametric representations can be based on physical attributes such as velocity and acceleration. In multi-view applications, the apparent displacement between frames of the GOP may be related to geometric properties, notably scene depth, so that depth or reciprocal depth provides the natural basis for parametric descriptions.

In embodiments, it is possible to derive all required displacement relationships within a group of pictures (GOP) from the base model, even though there can be substantial levels of folding and occlusion between the base frame and other frames in a large GOP. This property avoids the necessity to encode auxiliary prediction modes (e.g., predict forward, backward, bi-directionally, etc.), as is done in current video coders.

In an embodiment, the base-anchored framework can support high quality temporal motion inference, which is computationally efficient and requires as few as half the coded motion fields used in conventional codecs, where the common tool of bi-directional prediction assigns two motion fields to each target frame.

Beyond coding efficiency, the base-anchored approach advantageously provides more geometrically consistent and meaningful displacement information. The availability of geometrically consistent displacement information improves visual perception, and facilitates the efficient deployment of highly scalable video and multi-view compression systems based on displacement-compensated lifting, where the feedback state machine used in traditional codecs is replaced by purely feed-forward transforms.

In accordance with a second aspect, the present invention provides a method for coding displacement fields within a video sequence, wherein the video frames are assigned to Groups of Pictures known as GOPs, a base displacement model is coded for each GOP, describing the displacement that carries each location in a designated base frame of the GOP to a corresponding location in each other frame of the GOP, and other displacement relationships between the frames of the GOP are inferred from the base displacement model, in accordance with the method of the first aspect of the invention.

In accordance with a third aspect, the present invention provides a method for displacement compensated prediction of certain image frames from other frames, wherein the frames are assigned to groups of pictures (GOPs), a base displacement model is provided for each GOP, describing the displacement that carries each location in a designated base frame of the GOP to a corresponding location in each other frame of the GOP, this base displacement model being used to infer displacement relationships between the frames of the GOP, and the inferred displacement field at a prediction target frame being used to predict that frame from one or more other frames in the GOP.

In accordance with a fourth aspect, the present invention provides a coding apparatus arranged to implement a method for representing displacement information in accordance with the first aspect of the invention.

In accordance with a fifth aspect, the present invention provides a coding apparatus arranged to implement a method for coding displacement fields in accordance with the second aspect of the invention.

In accordance with a sixth aspect, the present invention provides a coding apparatus arranged to implement a method for displacement compensated prediction in accordance with the third aspect of the invention.

In accordance with a seventh aspect, the present invention provides a decoding apparatus arranged to decode a signal coded by an apparatus in accordance with the fourth aspect of the invention or the fifth aspect of the invention or the sixth aspect of the invention.

In accordance with an eight aspect, the present invention provides a computer program, comprising instructions for controlling a computer to implement a method in accordance with the first aspect, second aspect or third aspect of the invention.

In accordance with a ninth aspect, the present invention provides a non-volatile computer readable medium, providing a computer program, in accordance with the eight aspect of the invention.

In accordance with a tenth aspect, the present invention provides a data signal, comprising a computer program in accordance with the eight aspect of the invention.

3 BRIEF DESCRIPTION OF THE FIGURES

Features and the advantages of the present invention will become apparent from the following description of embodiments thereof, by way of example only, with reference to the accompanying drawings, in which:

FIG. 6 is an overview of an encoder that employs the base model and inference scheme in accordance with an embodiment of the invention, and FIG. 7 is an overview of a decoder that employs the base model and inference scheme in accordance with an embodiment of the invention.

4 DETAILED DESCRIPTION OF EMBODIMENTS

Figure 1:
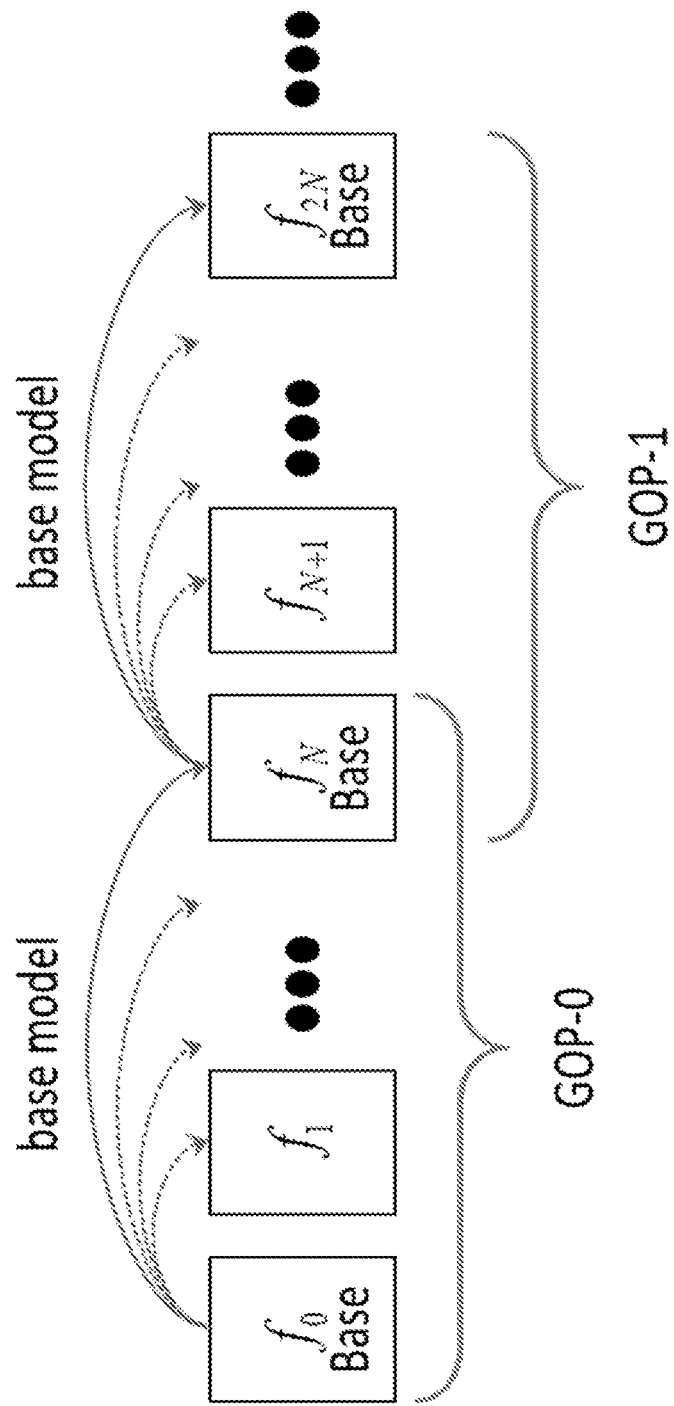
FIG. 1 is an illustration of base-anchored displacement in the case of 1D Group of Pictures (GOP), in accordance with an embodiment.
Figure 2:
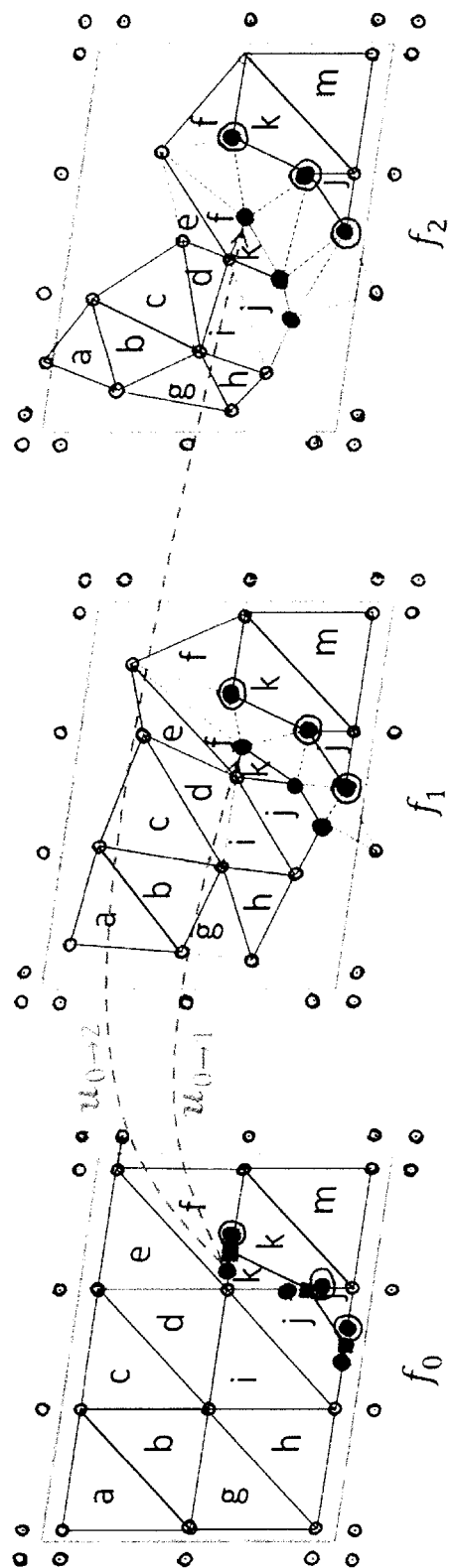
FIG. 2 is an illustration of a number of representative frames of an image/video sequence, illustrating principles of the base anchoring, in accordance with an embodiment.

For the sake of simplicity, we begin our description of an embodiment of the invention by considering a one dimensional arrangement of frames (1D GOP), as illustrated in FIG. 1; the more general case of higher-dimensional GOPs is detailed in Section 4.5. FIG. 2 illustrates some of the key ideas behind the base-anchored framework. The base anchored model is illustrated with a regular triangular mesh and a GOP with a regular triangular mesh and a GOP of N=3 frames; letters identify corresponding triangles in each frame; displacement information (dashed arrows) is coded on the nodes (black circles) of the base mesh, shown only for one node; black squares identify break locations on the arcs of the base mesh; shaded grey regions reveal "holes" that arise from break-induced discontinuities in the base displacement field; full black circles (dots) and black dots in circles show the starting locations of "break-induced" nodes, prior to "backfilling"—full black circles (dots) and black dots in circles actually coincide with the black squares in the base frame.

All displacement information for a GOP is described within its base frame, denoted here as $f_0$. Importantly, the displacement field is piecewise smooth, being expected to exhibit discontinuities around object boundaries. One way to describe such displacement fields is through a triangular mesh that is allowed to tear at certain locations—its breaks. Methods for representing and encoding such displacement models exist. For example, in the case of single-view video compression, [19] generalizes the mesh to a wavelet-based motion model based on affine interpolation, which is coupled with an efficient and highly scalable method for coding "arc breakpoints" [20], which adapt the wavelet basis functions in the vicinity of displacement discontinuities. For simplicity of explanation, FIG. 2 shows only a coarse regular triangular mesh, with 3 illustrative breakpoints.

As shown in the figure, nodes of the mesh carry one displacement vector for each of the N−1 non-base frames in the N-frame GOP, denoted as $u_{0 \to j}$, $j \in \{1,N\}$. Consider first the case in which there are no breaks. In this case, the node displacement vectors serve to continuously warp the mesh from the base frame to each other frame in the GOP. To ensure that all frames in the GOP are fully covered by these warped meshes, it is sufficient to define the base mesh over a region that is slightly larger than the original frame (1 pixel is sufficient), assigning 0 displacement to the nodes that fall in this extension region; extensions of this form are illustrated in the figure with light grey lines. Alternatively, in embodiments mesh nodes outside the original frame can be assigned the displacement of their adjacent node(s) in the frame. In order to still guarantee full coverage, these nodes have to be mapped according to their displacement vector, effectively extrapolating the displacement at frame boundaries rather than creating a linear ramp as achieved by assigning a 0 displacement vector. While these elementary extension methods are sufficient, more physically meaningful extension mechanisms will be apparent to those skilled in the art. For example, rather than extrapolating frame boundary displacement vectors, information from base meshes from adjacent GOPs can be used in such regions; one way to achieve this is explained in Section 4.1.2, which describes a general method for "augmenting" the base mesh in disoccluded regions.

The consequence of this covering property is that a complete reverse displacement field can be deduced for each non-base frame, anchored at that frame and pointing back to the base frame. In general, however, this reverse displacement field would not be unique, due to folding in the mesh. Folding means that some locations $s_k$ in a non-base frame $f_k$ may be mapped by two or more base frame locations $r_k^1$, $r_k^2$, ...; we use the term double mappings for all such situations. It follows that the base-anchored displacement representation is not complete without a robust mechanism to resolve double mappings, identifying the specific location $r_k^i$ that is visible (i.e. in the foreground) in frame $f_k$; the corresponding resolved displacement vector, pointing back to the base frame, is then $r_k^i$-$s_k$. In the case where the base model incorporates scene depth (or reciprocal depth) information, the ambiguity created by double mappings can be resolved immediately by identifying the visible location $r_k^i$ as the one with smallest depth. In the more general case, where explicit depth information is either not available or not sufficient to describe the displacement relationships between the base frame and all other frames of the GOP, more advanced techniques can be used to resolve double mappings—see Section 4.2 for a description of how discontinuities in the displacement field can be used to identify local foreground objects.

Now consider the more interesting case where the base displacement field involves breaks, illustrated by red dots in FIG. 2. Breakpoints partition base mesh elements into smaller regions, as suggested in the figure. Moreover, each breakpoint effectively introduces two new mesh nodes, illustrated by green and orange dots in the figure, whose locations coincide with the break in the base frame and whose displacement vectors are obtained by replicating or extrapolating the displacement vector from each end of the arc that is broken. Mapping these new break-induced nodes into each non-base frame, using their respective displacement vectors, can open up "holes" in the mesh, corresponding to regions in the non-base frame that are not visible from the base frame. These so-called disoccluded regions are illustrated by pink shading in the figure. Break-induced discontinuities in the displacement field also provide a rich source of double mappings (not shown in the figure), corresponding to areas of occlusion; as one side of a foreground object disoccludes background content, the other side typically produces double mappings.

Thus, to complete the base-anchored displacement representation, it is necessary both to resolve double mappings and to assign appropriate displacement information within the disoccluded regions of non-base frames, so that displacement compensated prediction operations can be used to predict any frame of the GOP from any other frame of the GOP, and to deduce the locations where the prediction is valid.

Solutions to these problems are aspects of the embodiments, which are explained in the following.

4.1 Assigning Displacement Information in Disoccluded Regions Via Backfilling To address the second problem raised above, namely the one of assigning physically meaningful displacement information in disoccluded regions, an embodiment employs a novel backfilling methodology. Triangles formed by breakpoint-induced nodes in the base frame (green and orange dots in FIG. 2) are necessarily stretching (their area increases significantly when they are mapped). Roughly half of these stretching triangles, which are expected to form around discontinuities (i.e., object boundaries) in the displacement field, are "disoccluding"; the remaining stretching triangles are "folding", indicating regions of double mappings. Disoccluding triangles are identified as triangles with a positive determinant, whereas folding triangles are characterized by a negative determinant. Folding triangles map to regions where at least two other triangles (one of the local foreground and one of the local background object) will map to, and hence are discarded. Disoccluding triangles, on the other hand, can map to regions where no other triangle maps to; these triangles need to be handled separately, which is described in the following. Holes created by disocclusion are first filled by adding so-called "break-induced mesh elements" that link the breakpoint-induced nodes in the base frame. These mesh elements have zero size in the base frame, but expand to fill disoccluded regions in the non-base frames, as illustrated by the dashed red lines in FIG. 2.

More generally, disoccluded regions in a non-base frame always involve substantial expansion, where the displacement found within a small region in the base frame expands that region to a much larger one in the non-base frame. The use of break-induced nodes, as described here, avoids any ambiguity in the identification of disocclusions, because the break-induced nodes from each side of a discontinuity in the displacement field are co-located in the base frame, leading to mesh elements with zero area that exhibit infinite expansion ratios wherever disocclusions arise in the non-base frame.

Accordingly, we introduce the term "∞ element" for these special mesh elements that are associated with break-induced mesh nodes. It is worth highlighting the following properties of ∞ element:

1. Of the mesh nodes that form an ∞ element, at least two are co-located in the base frame.

2. The presence of ∞ elements in the mesh is sufficient to cover all regions of disocclusion in every non-base frame. This means that each frame in a GOP is certain to be covered by mesh elements from the base frame that are mapped in accordance with the associated displacements.

While ∞ elements do ensure that a reverse displacement field exists everywhere, pointing back to the base frame from any non-base frame, they do not lead to physically meaningful reverse displacement values. This is because half the break-induced nodes (e.g., full black circles (dots)) associated with an ∞ element move with the background, while the other half (e.g., black dots in circles) move with the foreground. Displacement within a disoccluded region, however, should be associated entirely with the (local) background.

The backfilling scheme starts by assigning new displacements to disoccluded regions in the last frame of the GOP, which can be identified as the "back-filled" frame for the purpose of this description. As mentioned above, each disoccluded region in the back-filled frame starts out being covered by ∞ elements that have zero size in the base frame. In the following, we describe two different ways of assigning physically more meaningful displacement information in disoccluded regions. The first, more generic method, extrapolates the local background information. The second method, called basemesh augmentation, leverages displacement information that is provided at the back-filled frame by other means, to augment the current base mesh; this method is of particular interest when the back-filled frame coincides with the baseframe of another GOP.

4.1.1 Backfilling Using Background Extrapolation

Figure 3:
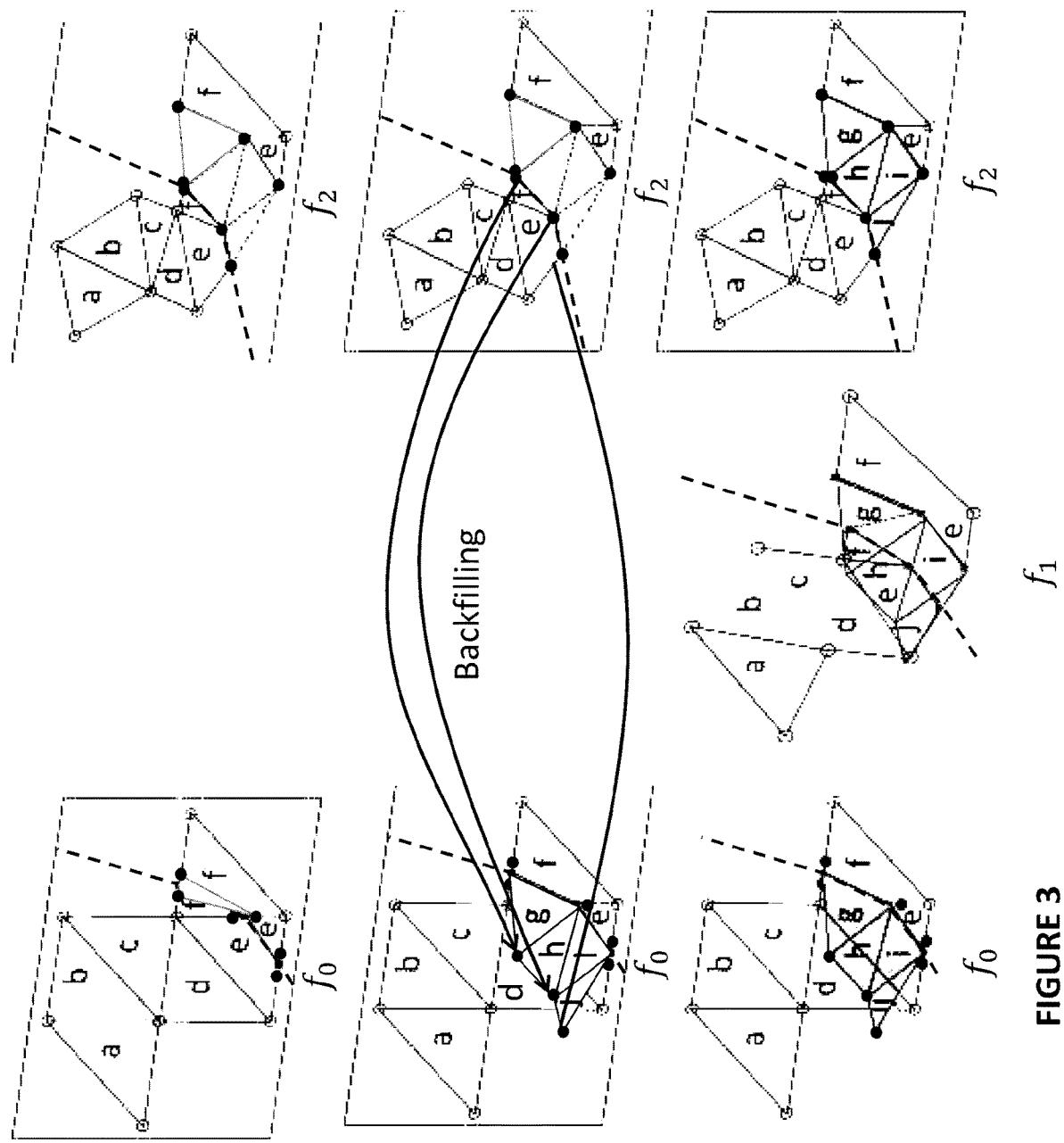
FIG. 3 is an illustration of a displacement backfilling strategy, in accordance with an embodiment.

This section describes a generic method of how a local background displacement layer can be added to the base mesh in regions that are disoccluding. We use FIG. 3 to illustrate the procedure. In the figure, mesh elements a-d belong to the foreground object that displaces to the left, and mesh elements e/f are crossing the object boundary (red dashed line); for ease of illustration, the background is static (i.e., no displacement). As shown in FIG. 3a, a break-induced mesh element of zero size in the base frame in $f_0$, whose nodes are indicated by orange and green circles, expands as it is mapped to the next base frame $f_2$, opening up a hole (yellow triangles).

To fill such disocclusion holes in the back-filled frame with physically meaningful displacement values, each mapped ∞ element that is visible in the back-filled frame (i.e., not covered by other mesh elements mapped from the base-frame) is first replicated to produce what will become a back-fill element. Consequently, the mesh nodes that delineate each back-fill element include at least two break-induced nodes, being co-located in the base frame. For each pair of break-induced nodes, one belongs to the foreground side of the break and one belongs to the background side of the break. Distinguishing between these is very important to the back-filling procedure. Each break-induced node that is identified as belonging to the foreground is also replicated, and the replica is associated with the relevant back-fill element(s) in place of the original break-induced node that is associated only with ∞ element(s). The replicated nodes are identified as back-fill nodes, and are illustrated in FIG. 3b as purple dots; these can also be viewed as "free nodes", since the displacement vector initially assigned to these nodes from the base model can be freely changed to improve consistency with the uncovered background, whose displacement vectors should be modeled by the back-fill elements.

To distinguish break-induced nodes that belong to the foreground from those that belong to the background is quite straightforward in the case where the base model incorporates scene depth (or reciprocal depth) values—since break-induced nodes come in pairs, being co-located in the base frame, the node with the larger depth in each pair is naturally associated with the background, leaving the other node associated with the foreground. In the more general case, where depth is not available or insufficient to fully explain the displacement fields, more advanced techniques can be used to distinguish between foreground and background associated nodes within a break-induced pair—see Section 4.3.

The mapped locations of back-fill nodes in the back-filled frame must agree with the mapped locations of the break-induced nodes from which they were spawned, but the backfilling strategy assigns new displacement vectors to these nodes, effectively changing their locations within all other frames, including the base frame. In this way, the ∞ elements that span disocclusions in the back-filled frame are remapped into back-fill elements (triangles g-h in FIG. 3b), whose appearance is identical to the corresponding ∞ elements in the back-filled frame, but not in the other frames.

Displacement vectors are assigned to back-fill nodes based on an extrapolation procedure that averages the displacement vectors found on the other node(s) of the back-fill mesh elements—these are the non-free nodes from each pair of break-induced nodes that defined the original ∞ elements. In an embodiment, the displacement vectors for the free nodes are found by assigning a weighted average of all the "fixed" nodes (i.e., the ones carrying local background displacement information) in the grid of the base mesh, obtained via a splatting procedure. This creates a lookup table of displacement values that can efficiently be implemented in a computer graphics card. The reassignment of displacement vectors to back-fill nodes means that back-fill mesh elements no longer have zero size in the base frame, unlike the ∞ elements. As illustrated in FIG. 3c, when projected back into the base frame, back-fill elements become new "underlying" descriptions of the displacement geometry that can be interpreted as a local background model.

When these back-fill elements are mapped to an intermediate frame location (e.g., $f_1$ in FIG. 3c), a part of the background layer gets uncovered (green area), whereas another part (yellow area) is still covered by foreground mesh elements. The importance is that this enables to assign geometrically consistent displacement information in regions of disocclusion for any frame that is interpolated in between the base frames.

In this way, the original 2D base mesh is converted to a layered mesh through inter-frame reasoning alone, without the need for any additional coded displacement information or other side information.

4.1.2 Backfilling Using an Augmenting Mesh

This section describes a way of augmenting the current base mesh with information from another mesh—this can be either a base mesh of another GOP, or another mesh that has been coded; we refer to this mesh as the augmenting mesh. In one embodiment, all triangles of the other base frame that cover regions mapped by infinity triangles from the current base mesh (i.e., the set of all disoccluded regions) are mapped from the augmenting mesh back to the current base mesh, where they form a (local background) augmentation layer. The main appeal of base mesh augmentation is that it is able to handle disoccluded regions where new objects are appearing.

The main issue that arises with base mesh augmentation is that since the augmenting mesh elements are only applied in regions where the current base mesh has no valid values, inconsistencies can be created at the (hard) transition boundary from the current base mesh to the backfilled augmenting mesh elements. In addition, the augmenting mesh elements can potentially be large enough to span unrelated disocclusion regions, leading to ambiguities in the back-filling procedure. In order to greatly mitigate this problem, we partition large mesh elements into smaller ones, based on a prescribed maximum element size, keeping only the ones that cover disoccluded regions.

Irrespective of the back-filling method that is employed, the back-fill mesh elements are all collected within the base frame as part of an augmented base model, where they can be interpreted as an inferred local background layer, which guarantees consistent displacement assignments in disoccluded regions across multiple interpolated frames.

4.2 Recursive Backfilling and Displacement Compensated Frame Prediction

The process described above is called back-filling, because the assignment of displacement vectors to back-fill nodes, which leads to new underlying mesh elements in the base frame, is driven initially from the last frame of the GOP—the back-filled frame. This is the frame that is furthest from the base frame, where regions of disocclusion are likely to be largest. While not strictly necessary, it is desirable to arrange for the inter-frame transform to provide intra-coded texture information at the base frames. The remapped mesh elements produced by backfilling correspond to content that can be predicted from the last frame of the GOP (the next base frame) but not from the GOP's own base frame.

After the inclusion of back-fill elements within the base model, all elements of the model can be mapped to an intermediate frame in the GOP. The presence of ∞ elements, which are not removed until all back filling is complete, ensures that these mapped elements cover the intermediate frame, regardless of the underlying geometry. It is also likely that mapped ∞ elements are covered within the intermediate frame, either by mapped back-fill elements or mapped original mesh elements from the base model. It can happen, however, that small regions of disocclusion remain that are covered only by the ∞ elements. To address this, the back-filling procedure is repeated, replicating uncovered ∞ elements with new back-fill elements, whose mapped appearance in the intermediate frame (the new back-fill frame) is identical to that of the ∞ elements.

The new back-fill elements are defined by mesh nodes that arise from pairs of original break-induced nodes, whose foreground/background assignment is either already known (from preceding back-filling steps) or needs to be newly determined, as explained above. Once determined, the background node within each break-induced pair is replicated to form a new back-fill node that is associated with the relevant back-fill element. These new back-fill nodes are free to be assigned new displacement vectors, using the same extrapolation procedure described in Section 4.1.1, which results in the back-fill mesh elements constituting a new local background layer within the base frame.

In this way, as intermediate frames are visited within the GOP, the base model is progressively augmented with back-fill nodes and back-fill mesh elements, so that the base model eventually describes the relationship between all frames of the GOP in a complete and geometrically consistent manner.

The presence of back-fill elements means that double mappings become increasingly likely, as mesh elements from the augmented base model are mapped to new intermediate frames. All such double mappings can be resolved using the methods briefly introduced already. It is helpful, however, to assign a layer-ID to each back-fill element, which identifies the back-filled frame in which the back-fill element was discovered. Original elements of the base mesh are assigned layer-ID 0. Elements introduced when back-filling the last frame of the GOP (e.g., $f_N$) are assigned layer-ID 1. Elements introduced when back-filling the first intermediate frame (e.g., $f_{N/2}$) are assigned layer-ID 2, and so forth. The ∞ elements are conceptually assigned a layer-id of ∞. This way, when a frame location is mapped by different mesh elements, the double mapping can be resolved in favour of the element with smaller ID.

In an embodiment, to perform the mapping of mesh elements, resolve double mappings and identify ∞ elements that need to be replicated into new back-fill elements in an efficient way, one can use concepts similar to those found in traditional computer graphics workflows. Each node in the (augmented) base model is assigned a unique ID and each mesh element is also assigned a unique ID. When mapping base model elements to another frame, that frame is assigned an ID-map, with one ID for every pixel location. The ID-map is populated progressively as each mesh element is mapped, transferring the element's ID to all empty locations in the ID-map that are covered by the mapped element. Double mappings are discovered immediately when a mesh element covers a location in the mapped frame's ID-map that is not empty. At that point, the existing ID is used to immediately discover the mesh element that maps to the same location as the one currently being considered, and the double mapping resolution techniques are applied, as described already. Once all mesh elements have been mapped to the frame in question, any locations in the ID-map that identify ∞ elements are the ones for which back-filling is required. Simple pixel and reference counting techniques can be used to identify all ∞ elements that remain visible, each of which is replicated to produce a back-fill element and back-fill nodes that are remapped.

To minimize the number of back-fill mesh elements that need to be generated to cover a GOP, an embodiment employs a recursive back-filling strategy. In this approach, the first back-filled frame associated with the GOP based at frame $f_0$ is $f_N$. The next back-filled frame is $f_{N/2}$. After this, frames $f_{N/4}$ and $f_{3N/2}$ are back-filled. The process continues in this way, following a breadth-first dyadic tree scan of the GOP.

It is worth noting that new back-filled mesh elements that are added during the back-filling of intermediate frames (other than $f_N$) correspond to regions of the intermediate frame that are covered (i.e., not visible) in both the base frame $f_0$ and the next GOP's base frame $f_N$. These regions can thus be understood as bi-disoccluded. For the displacement compensated inter-frame transform, bi-disoccluded regions present a particular challenge. These are regions that might be intra-coded in a conventional video codec. The analogous operation for our inter-frame transform is inpainting. Many spatial inpainting methods are known to those skilled in the art, ranging from simple pixel replication methods to directional extrapolation techniques and gradient integration methods.

Fortunately, no prediction mode flags need be explicitly communicated to announce the need for intra-coding, or partially occluded (uni-directional) prediction. Instead, all visibility information emerges naturally from the mapping of mesh elements.

4.3 Foreground/Background Disambiguation and Double Mappings

As mentioned earlier, as mesh elements are mapped from the base mesh to other frames in the GOP, double mappings may occur. These arise from both breaks and folding in the mesh. Wherever double mappings are observed, it is necessary to distinguish the displacement of the foreground object from that of underlying (i.e. local background) objects. Discrimination between foreground and background displacement vectors is also required to identify free nodes in the backfilling procedure described above.

Fortunately, absolute layering need not be determined or estimated. We only ever need to discriminate between two original or mapped displacement models, belonging to nodes that are co-incident in a certain frame. In cases where the base model incorporates scene depth, this binary discrimination can be very simple, identifying the foreground model as the one which smaller depth.

For cases in which depth information is not available or might not be known precisely, additional cues may be required to discriminate between foreground and background models that map to the same location. For this, we can rely upon the observation that discontinuities in displacement fields occur at the boundaries of foreground objects. This means that the foreground displacement should be the one that maps discontinuities in the base mesh for frame $f_0$ to discontinuities in the next base mesh, associated with frame $f_N$. Such strategies have been found to be very successful in the inference of motion and for temporal frame interpolation (e.g., [13]).

This embodiment relies upon the observation that the foreground displacement model should be the one that maps discontinuities in the base mesh for frame $f_0$ to discontinuities in the next base mesh, associated with frame $f_N$. In embodiments of the base-anchored displacement framework, the last frame of each GOP is also the first frame of the next GOP, so that the next GOP's base displacement model $M_N$, that is anchored in frame $f_N$, can be compared with the displacement found in the base displacement model $M_0$ of the current GOP. Essentially, a discontinuity (or break) in the base displacement model $M_0$ can be mapped to frame $f_N$ using the displacement vector found on either side of the break; the displacement vector which maps the discontinuity to a region of similar divergence or convergence in model $M_N$, is the one that is more likely to correspond to the foreground displacement vector.

For the purpose of the backfilling procedure, we note that each pair of co-located break-induced nodes in the base mesh maps to a line segment in the back-filled frame that spans the disoccluded region. This phenomenon corresponds to divergence in the base model $M_0$. From each such pair of break-induced nodes, the free node is identified as the one whose location in frame $f_N$ exhibits a divergence value in the next base model $M_N$ that is most similar to the divergence in $M_0$.

For the purpose of resolving double mappings, the mesh nodes or regions that belong to the foreground are determined as follows (see FIG. 4). First, the "origin" of any detected double mapping $s_k$ in non-base frame $f_k$ is found by searching the line segment connecting the corresponding source locations $r_k^1$ and $r_k^2$ in the base-frame, looking for the location at which the displacement field folds. We refer to this line segment as the "fold search path." Folding is associated with convergence in the base displacement field, so the fold location is identified as the point along the search path at which the displacement convergence value (negative divergence) is largest. This location usually corresponds to a break in the base displacement field. The fold location is mapped to frame $f_N$, using the displacement vectors on each side of the fold (e.g., at a distance of 1 pixel in each direction along the fold search path), and the divergence in the next base displacement model $M_N$ is compared with that in the base displacement model $M_0$, to discover which displacement vector belongs to the foreground. The foreground side of the fold is the one whose displacement vector carries it to a location of similar convergence (negative divergence) in the next base-frame.

Figure 4:
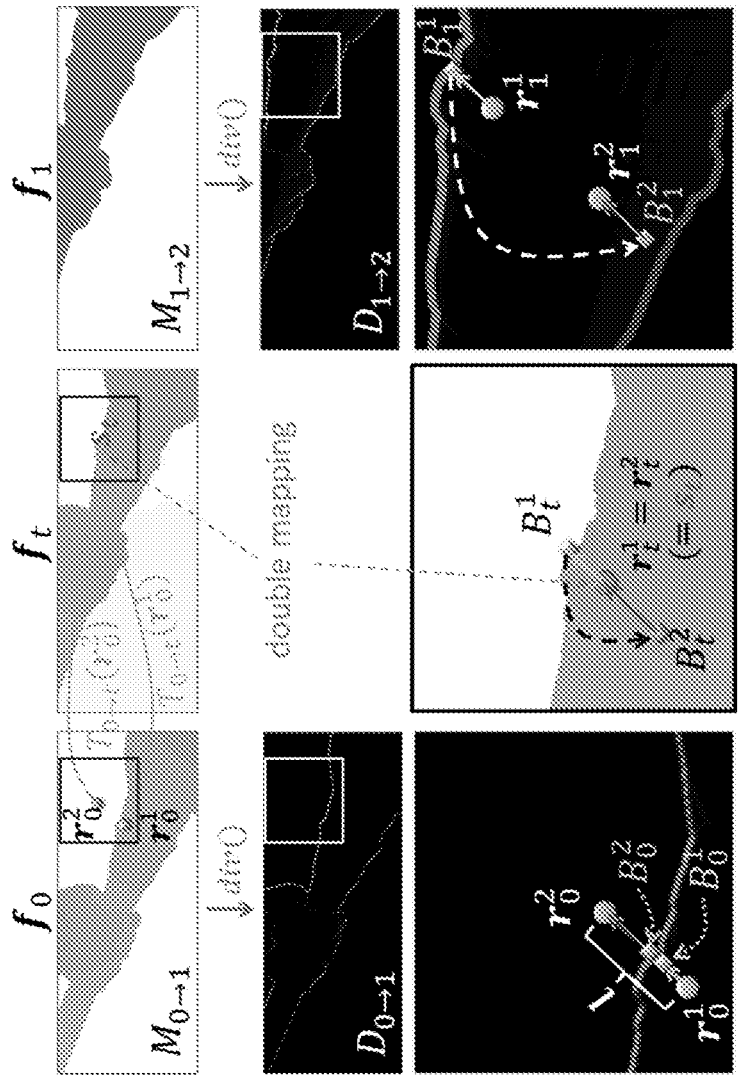
FIG. 4 is an illustration of double mapping resolving procedure in accordance with an embodiment of the invention, in accordance with an embodiment.

FIG. 4 is an illustration of a double mapping resolving procedure that uses divergence of the displacement field to identify the foreground object. When mapped from $f_0$ to $f_t$ using $T_{0 \to t}$ where $T_{0 \to t}$ defines the affine mapping from frame $f_0$, $r_0^1$ and $r_0^2$ map to the same location m in $f_t$. We search for the point of maximum convergence (red) along the "fold search path" 1, formed by connecting $r_0^1$ and $r_0^2$. Let $B_0^1$ and $B_0^2$ be the two points on the line slightly closer to $r_0^1$ and $r_0^2$, respectively. When $B_0^1$ and $B_0^2$ are mapped to the next base frame $f_1$, the one which maps into a region of larger convergence identifies the foreground displacement; in the example, $T_{0 \to 1}(B_0^1)$ is the foreground displacement, since $B_1^1$ falls into a region of larger convergence.

After all mesh elements have been mapped to the target frame and all double mappings are resolved, we have a complete displacement field at the target frame.

4.4 Visibility-Aware Displacement-Compensated Frame Interpolation

In the last section, we described how displacement information can be mapped from a base frame A to a target frame $f_t$ we seek to interpolate. In this section, we describe how the target frame $f_t$ can be interpolated from $N=\{1,2,\ldots\}$ reference frames $\{f_{r_j}\}, j \in \{1,\ldots,N\}$. Since the base model holds a description of the displacement from the base frame to any other frame in the GOP, one can readily infer the displacement from any frame of the GOP to any other frame of the GOP, using simple composition of displacement vectors. That is, given a location $x_t$ in the target frame $f_t$, the corresponding location in a reference frame $f_r$ can be obtained as follows:

$u_{f_t \to f_r}(x_t) = -u_{f_t \to f_b}(x_t) + u_{f_b \to f_r}(x_b)$, where $x_b = x_t - u_{f_t \to f_b}(x_t)$.

It is important to note that while the above formulation allows to establish correspondences between the target frame and all reference frames involved in the prediction of $f_t$, not all locations are visible in all reference frames.

In order to assess the visibility, perhaps the simplest way would be to compare mesh element IDs and label locations as visible if the mesh element IDs match. However, this reasoning is problematic at boundaries of the mesh elements, since the sample location in the reference frame does not in general fall onto an integer location, and the mesh element ID of the nearest neighbour might be different than the ID in the target frame mesh, even if the neighboring mesh element describes the same (affine) plane. Furthermore, mesh elements might shrink to an area smaller than 1, in which case they might not fall onto any integer location, and hence they are not registered in the mesh element ID map.

In light of this, a more robust way is to perform a forward-/backward consistency check. Using $x_r = x_t + u_{f_t \to f_r}(x_t)$ denote the location is mapped to from the reference to the target frame, the forward-/backward consistency check is simply $\|u_{f_t \to f_r}(x_t)\| = \|u_{f_r \to f_t}(x_r) + \theta\|$, where $\theta$ is a small value added to account for small differences in the displacement values that are due to rounding errors. We hence compute visibility masks for each reference frame involved in the prediction of a target frame as follows $$I_{r_j}[m] = \begin{cases} 1, & \text{if } \|u_{f_t \to f_r}(m_t)\| = \|u_{f_r \to f_t}(m_r) + \theta\| \\ 0, & \text{otherwise} \end{cases}$$

where $m_r = m_t + u_{f_t \to f_r}(m_t)$.

Then, each location m in the target frame can be computed as $$f_t[m] = \begin{cases} \dfrac{\sum_{j=1}^{N} I_{r_j}[m] f_{r_j \to t}[m] d(f_{r_j}, f_t)}{\sum_{j=1}^{N} I_{r_j}[m] d(f_{r_j}, f_t)}, & \text{if } \sum_{j=1}^{N} I_{r_j}[m] > 0 \\ \dfrac{\sum_{j=1}^{N} f_{r_j \to t}[m] d(f_{r_j}, f_t)}{\sum_{j=1}^{N} d(f_{r_j}, f_t)}, & \text{otherwise} \end{cases}$$

where $f_{r_j \to t}$ is used to denote the displacement compensated reference frame $f_{r_j}$ to the target frame $f_t$, and $d(.,.)$ is a distance measure. That is, each location in the target frame is predicted as a weighted combination of all reference frames where the location is visible, weighted by the distance of the target frame to the respective reference frame.

In the case where the location is not visible in any reference frame, a number of methods can be applied. In the formulation above, we resort to simple weighted prediction for locations that are deemed not visible. Another, preferred way is to employ inpainting strategies to fill in all locations that are not visible in any reference frame, which generally lead to more plausible interpolations in regions that are not visible in any of the reference frames.

4.5 Extension to Higher-Dimensional GOPs

Here we extend the principles above to handle higher-dimensional GOPs. For simplicity, we consider the case of two-dimensional GOPs, which arises naturally in the context of multi-view imaging applications. For example, a 2D GOP is appropriate for describing static imagery acquired via a 2D camera array, or multi-view video acquired via a linear (1D) camera array. Extensions to higher dimensional GOPs to multi-view video with non-linear camera arrays should be apparent to those skilled in the art, so need not be explicitly discussed here.

Figure 5:
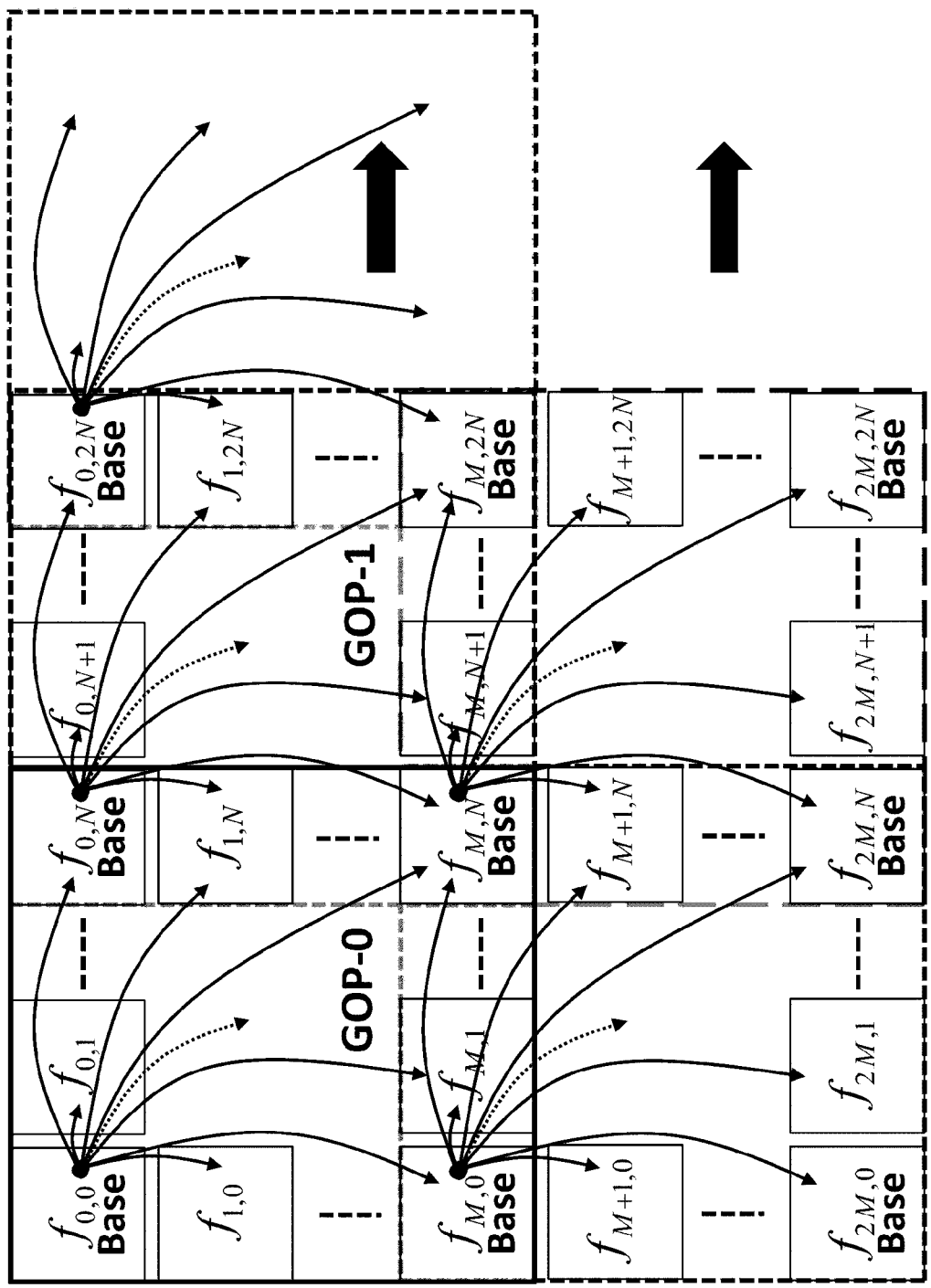
FIG. 5 is an illustration of the extension of the base anchoring to higher-dimensional GOPs, in accordance with an embodiment.

FIG. 5 is an example tiling of a higher-dimensional group of pictures (GOP). Each GOP has one base frame in its upper left corner. Adjacent GOPs overlap by one frame, in each direction and the frames that would be base frames for additional overlapping GOPs that do not exist are shown in light grey text—these are so-called "disenfranchised base frames."

FIG. 5 shows a GOP tiling scheme that represents the most natural extension of the 1D GOP structure presented before. In this scheme, the base frame for a GOP is in its upper left corner, and adjacent GOPs overlap by one frame, horizontally and vertically. As in the 1D case, we assume that the displacement-compensated inter-frame transform involves prediction only between frames that are found in the same GOP. This is why we require the GOPs to overlap. This way, common frames found at the intersection between adjacent GOPs can be used to predict frames found within each of those GOPs.

An additional benefit to overlapping GOPs is the potential availability of additional coded displacement information. As mentioned earlier, 2D displacement fields are coded only within the base frames, and each GOP (potentially) has only one base frame of its own—the one in its upper left corner here. However, where a GOP overlaps with an adjacent GOP, having its own base frames with coded displacement information, it is possible to use this separate information to improve the performance of the first stage of back-filling using the base mesh augmentation strategy described in Section 4.1.2.

To recapitulate, when the mesh elements of base frame $f_{0,0}$ for GOP-0 are mapped to $f_{0,N}$, for back-fill elements are generated to fill regions within that frame (the back-filled frame) that are visible within $f_{0,N}$ but not visible within $f_{0,0}$. The back-filling algorithm described in Section 4.2, uses an extrapolation procedure to assign displacement values to the back-fill nodes that are created to remap $\infty$ elements. However, frame $f_{0,N}$ already contains explicitly coded displacement information that can be used in place of extrapolation. This is true only when the back-filled frame is the base of another GOP.

Some frames within FIG. 5 are identified as base frames, even though they have no adjacent GOP of their own. For example, frame $f_{2M,0}$ has no GOP of its own, unless the tiling continues to a third row of GOPs. These disenfranchised base frames need carry no coded displacement information. However, it could be beneficial to selectively encode displacement information within a disenfranchised base so that it can be used to improve the quality of back-filled geometry for the GOPs that include it.

The back-filling algorithm is identical for 1D and 2D GOPs, but in the 2D case there is no obvious order in which frames should be visited to generate back-fill mesh elements. The back-filling order determines the order in which the base model for a GOP is augmented, which ultimately affects the inferred displacement values that are generated for any given frame of the GOP. It is important that the back-filling order is well-defined, since the displacement-compensated inter-frame transform generally depends upon it.

4.6 Texture Optimizations for Displacement-Compensated Frame Interpolation of Target Frames The motion-compensated prediction of a target frame $f_t$ can exhibit visible artefacts around object boundaries, where the displacement field is likely to be discontinuous. In this section, we present two embodiments that selectively reduce such artefacts. As before, we assume that the target frame $f_t$ is predicted from N reference frames $f_{r_j}, j \in \{1, \ldots, N\}$; we note here that depending on the transform structure, the base frame itself might be a target frame.

4.6.1 Smoothing of the Transition Between Uni- and Multi-Directional Prediction At disocclusion boundaries, the upsampled frame interpolated using the occlusion-aware frame interpolation method of can have problems; the sudden transition from uni- to multi-directional prediction can lead to artificial boundaries in places where the illumination changes between the two reference frames. We observe that none of the displacement compensated reference frames $f_{r_j \to t}$ is expected to contain such a transition boundary in the texture data, which only arises once the displacement compensated frames are blended together. The method we propose therefore consists of limiting the frequency content at each location of $f_t$ to the one of the motion-compensated reference frames.

In a preferred embodiment, this is achieved in the wavelet domain. Other ways of achieving similar results are apparent to those skilled in the art. We use $\tilde{f}_t$ to denote the 2D-wavelet decomposition (interleaved) of frame $f_t$, and use $\tilde{f}_t[k]$ to access a specific wavelet coefficient k, where k collects information about level, subband, and spatial position in the transform. Then, we define $$\tau[k] = \max(\tilde{f}_{r_1}[k]\tilde{f}_{r_1 \to t}[k], \ldots, \tilde{f}_{r_N \to t}[k]).$$

That is, $\tau[k]$ represents the largest (visible) wavelet coefficient of the wavelet decomposition of the displacement compensated reference frames, evaluated at k. Then, $\tilde{f}_t^{(w)}[k]$ is computed as follows:

$$\tilde{f}_t^{(W)}[k] = \begin{cases} \tau[k] \cdot \mathrm{sgn}(\tilde{f}_t[k]) & \tau[k] \le |\tilde{f}_t[k]| \\ \tilde{f}_t[k] & \text{otherwise} \end{cases}.$$

$f_t^{(w)}$ is then obtained by synthesizing $\tilde{f}_t^{(w)}$. What is particularly appealing about this selective wavelet coefficient attenuation is that it is applied globally to the entire frame, and there are no heuristics or parameters involved.

4.6.2 Optical Blur Synthesis around Displacing Objects

Another artefact that can arise in the proposed embodiment is that overly sharp transitions are created at displacing object boundaries in the texture domain; this is because the inverted displacement fields $M_{t \to b}$ is discontinuous around displacing object boundaries. This effectively cuts out the foreground object and pastes it in the target frame. In practice, the transition in the reference frames is smoother due to optical blur, which is an inevitable aspect of the imaging process. The wavelet-based attenuation strategy described above cannot resolve this problem because the unnaturally sharp discontinuities are expected to be present in both of the displacement compensated reference frames $\{f_{r_j}\}$.

An embodiment that achieves an effective way of synthesizing optical blur uses the divergence of the mapped (and inverted) displacement field $M_{t \to b}$ as an indication of displacing object boundaries. A low-pass filter is applied to all pixels where the absolute value of the divergence of the displacement field is larger than a certain threshold θ; the displacement compensated non-base frame with optical blur synthesis, denoted as $f_t^{(o)}$, is then obtained as:

$$f_t^{(O)}[m] = \begin{cases} (f_t * h)[m] & |div(M_{t \to b})| > \theta \\ f_t & \text{otherwise} \end{cases},$$

where h[m] is the kernel of a two-dimensional low-pass filter. Clearly, the two texture optimization methods described above can be combined together.

FIG. 6 shows an overview of an encoder that employs the proposed base model. Input to the encoder scheme is either a video sequence, multi view imagery, or a multi view video sequence. From the input, the base model is estimated (reference 100), which describes the displacement information (and other relevant relationships) form the base frame 101, to all other frames in the group of pictures (GOP). The base model 102 is then used to drive an inter-frame transform 103. The sub bands are then subjected to a spatial transform 104 that exploits spatial redundancies. Finally, sub bands and the base model are encoded 105 to form a code stream.

FIG. 7 shows an overview of a decoder that employs the proposed base model. Firstly, the sub bands and base model are decoded 110. Then, the sub bands are subjected to an inverse spatial transform 111. Lastly, the decoded sequence is obtained by reversing the interframe transform 112.

Encoders and de-coders implementing the methods, processes described above may be implemented using hardware, software, a combination of hardware, software and firmware. Where software is utilised, may be provided on computer readable mediums, or transmitted as a data signal, or in other way.

An element of the base-anchored approach in accordance with embodiments described above is the displacement backfilling procedure, whereby local background displacement layers are added to the base model whenever disocclusion holes are observed during displacement inference. These "background layers" guarantee the assignment of geometrically consistent displacement information in regions of disocclusion, which is highly important for visual perception. Another element is a robust method of identifying local foreground/background relationships around displacing objects in cases where such information cannot be deduced from the displacement information, as is for example the case when the displacement is due to motion in the scene. In these cases, we propose a foreground displacement identification procedure that is based on the observation that object boundaries displace with the foreground object.

Advantageously, in embodiments the base anchoring approach facilitates the deployment of compression systems that are highly scalable across space (i.e., multi-view) and/or time (i.e., video), enabling a seamless upsampling of arbitrary frame-rates across both dimensions. A compelling feature of the base-anchored approach is that not all the frames that are used to estimate the base displacement model must be coded. That is, one might use all frames that were recorded to estimate a high-quality displacement model; however, only a fraction of these frames is coded, and all "in-between" frames are purely interpolated using the described geometrically consistent frame interpolation procedure. This is in contrast to existing video compression systems, where motion information is described and estimated at every frame that is to be predicted (i.e., target frames). In such "prediction-centric" compression systems, the motion estimation is opportunistic (i.e., it does not explicitly attempt to describe the apparent motion of the scene), and hence it is not possible to increase the frame-rate at the decoder without (re-)estimating more meaningful motion.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

5. REFERENCES

[1] B.-D. Choi, J.-W. Han, C.-S. Kim and S.-J. Ko, "Motion-compensated frame interpolation using bilateral motion estimation and adaptive overlapped block motion compensation," *IEEE Transactions on Circuits and Systems for Video Technology*, vol. 17, no. 4, pp. 407-416, April 2007.

[2] S.-G. Jeong, C. Lee and C.-S. Kim, "Motion-compensated frame interpolation based on multihypothesis motion estimation and texture optimization," *IEEE Transactions on Image Processing*, vol. 22, no. 11, pp. 4495-4509, November 2013.

[3] D. Kim, H. Lim and H. Park, "Iterative true motion estimation for motion-compensated frame interpolation," *IEEE Transactions on Circuits and Systems for Video Technology*, vol. 23, no. 3, pp. 445-454, March 2013.

[4] A. Secker and D. Taubman, "Lifting-based invertible motion adaptive transform (LIMAT) framework for highly scalable video compression," *IEEE Transactions on Image Processing*, vol. 12, no. 12, pp. 1530-1542, December 2003.

[5] Y. Andreopoulos, A. Munteanu, J. Barbarien, M. van der Schaar, J. Cornelis and P. Schelkens, "In-band motion compensated temporal filtering," *Signal Processing: Image Communication*, vol. 19, no. 7, pp. 653-673, July 2004.

[6] M. Flierl and B. Girod, "Video coding with motion-compensated lifted wavelet transforms," *Signal processing: Image Communications*, vol. 19, no. 561-575, July 2004.

[7] A. Golbelkar and J. Woods, "Motion-compensated temporal filtering and motion vector coding using biorthogonal filters," *IEEE Transactions on Circuits and Systems for Video Technology*, vol. 17, no. 4, pp. 417-428, April 2007.

[8] C.-L. Chang, X. Zhu, P. Ramanathan and B. Girod, "Light field compression using disparity-compensated lifting and shape adaptation," *IEEE Transactions on Image Processing*, vol. 15, no. 4, pp. 793-806, April 2006.

[9] J.-U. Garbas, B. Pesquet-Popescu and A. Kaup, "Mehods and tools for wavelet-based scalable multiview video coding," *IEEE Transactions on Circuits and Systems for Video Technology*, vol. 21, no. 2, pp. 113-126, February 2011.

[10] H. G. Lalgudi, M. W. Marcellin, A. Bilgin, H. Oh and M. S. Nadar, "View compensated compression of volume rendered images for remote visualization," *IEEE Transactions on Image Processing*, vol. 18, no. 7, pp. 1501-1511, July 2009.

[11] R. Mathew and D. Taubman, "Scalable modeling of motion and boundary geometry with quad-tree node merging," *IEEE Transactions on Circuits and Systems for Video Technology*, vol. 21, no. 2, pp. 178-192, February 2011.

[12] S. Milani and G. Calvagno, "Segmentation-based motion compensation for enhanced video coding," *IEEE International Conference on Image Processing*, pp. 1685-1688, September 2011.

[13] I. Daribo, D. Florencio and G. Cheung, "Arbitrarily shaped sub-block motion prediction in texture map compression using depth information," *Picture Coding Symposium (PCS)*, pp. 121-124, May 2012.

[14] A. Zheng, Y. Yuan, H. Zhang, H. Yang, P. Wan and O. Au, "Motion vector fields based video coding," *IEEE International Conference on Image Processing*, pp. 2095-2099, Septembre 2015.

[15] G. Ottaviano and P. Kohli, "Compressible motion fields," *Proc. IEEE Conference on Computer Vision and Pattern Recognition (CVPR)*, pp. 2251-2258, June 2013.

[16] A. T. Naman and D. Taubman, "Flexible synthesis of video frames based on motion hints," *IEEE Transactions on Image Processing*, vol. 23, no. 9,

[17] D. Rufenacht, R. Mathew and D. Taubman, "A novel motion field anchoring paradigm for highly scalable wavelet-based video coding," *IEEE Transactions on Image Processing*, vol. 25, no. 1, pp. 39-52, January 2016.

[18] D. Rufenacht, R. Mathew and D. Taubman, "Bidirectional, occlusion-aware temporal frame interpolation in a highly scalable video setting," *Picture Coding Symposium (PCS)*, pp. 5-9, May 2015.

[19] R. Mathew, S. Young and D. Taubman, "Optimization of optical flow for scalable coding," *Picture Coding Symposium (PCS)*, pp. 70-74, May 2015.

[20] R. Mathew, D. Taubman and P. Zanuttigh, "Scalable coding of depth maps with R-D optimized embedding," *IEEE Transactions on Image Processing*, vol. 22, no. 5, pp. 1982-1995, May 2013.

[21] R. Szeliski and H.-Y. Shum, "Motion estimation with quadtree splines," *IEEE Transactions on Pattern Analysis and Machine Intelligence*, vol. 18, no. 12, pp. 1199-1210, December 1996.

[22] N. Mehrseresht and D. Taubman, "An efficient content-adaptive motion-compensated 3-D DWT with enhanced spatial and temporal scalability," *IEEE Transactions on Image Processing*, vol. 15, no. 3, pp. 1397-1412, March 2006.

[23] J. Revaud, P. Weinzaepfel, Z. Harchaoui and C. Schmid, "Epicflow: edge-preserving interpolation of correspondences for optical flow," *Proc. IEEE Conference on Computing and Visual Pattern Recognition (CVPR)*, June 2015.

[24] S. Young and D. Taubman, "Rate-distortion optimized optical flow estimation," *IEEE International Conference on Image Processing*, pp. 1677-1681, September 2015.

[25] D. Taubman, "High performance scalable image compression with EBCOT," *IEEE Transactions on Image Processing*, vol. 9, no. 7, pp. 1151-1170, July 2000.

[26] D. Sun, J. Wulff, E. Sudderth, H. Pfister and M. Black, "A fully connected layered model of foreground and background flow," *IEEE Conference on Computer Vision and Pattern Recognition (CVPR)*, pp. 2451-2458, 2013.

The invention claimed is:

1. A method of representing displacement information between the frames of a video and/or multiview sequence, comprising the steps of:
assigning at least one plurality of frames of said video and/or multiview sequence to a Group of Pictures (GOP);
providing a base displacement model for the GOP, the base displacement model describing a base displacement field that carries each location in a designated base frame of the GOP to a corresponding location in each other frame of the GOP; and
inferring other displacement relationships between the frames of the GOP from the base displacement model,
wherein the base displacement model is described via a deformable base mesh whose nodes are assigned one displacement vector for each non-base frame in the GOP, and
wherein breaks in the base displacement model are covered by a subset of elements of the base mesh, said subset of elements being break-induced mesh elements, said break-induced mesh elements being located between nodes, where the nodes of the break-induced mesh elements appear in co-located pairs, one node in each pair carrying displacement vectors associated with one side of the break, while the other carries said displacement vectors associated with the other side of the break.

2. The method of claim 1 in which the base displacement model describes piecewise smooth displacement fields from the base frame to each other frame of the GOP, with discontinuities breaks in the base displacement model.

3. The method of claim 1, in which a reverse displacement field, which carries locations in a non-base frame of the GOP back to the base frame, is inferred by mapping elements of the base mesh to said non-base frame, producing a set of inferred mesh elements whose node locations are obtained by displacing the corresponding base mesh node locations by the associated base displacement vectors, and assigning displacement vectors to the inferred mesh nodes by negating their associated base displacement vectors.

4. The method of claim 3, in which double mappings, corresponding to inferred mesh elements which overlap in said non-base frame, are resolved using a foreground-background discrimination process to determine which of the overlapping inferred mesh elements is more likely to belong to a foreground object.

5. The method of claim 1, wherein the frames of said video and/or multiview sequence are assigned to two or more GOPs, wherein in the method, one of the non-base frames for one GOP is a base frame of a second GOP, said second GOP having a base displacement model, said second GOP's base displacement model being a second base displacement model of said one GOP.

6. The method of claim 5, in which
one of the non-base frames for one GOP is a base frame of a second GOP, said second GOP having a base displacement model, said second GOP's base displacement model being a second base displacement model of the one GOP, and said second GOP's base frame being a second base frame of the one GOP; and
the foreground-background discrimination process is based on the location of folds in the base displacement field, discriminating between foreground and background sides of a fold location by using the base displacement information on each side of the fold location to map the fold location into a second base frame, and comparing the folding properties of a second base displacement model with those of the one GOP's base displacement field.

7. The method of claim 3, in which the inferred mesh elements in a non-base frame that result from the mapping of break-induced mesh elements in the base frame are used to identify regions of disocclusion in the non-base frame.

8. The method of claim 7 in which the reverse displacement vector associated with break-induced inferred mesh elements in a non-base frame is modified in order to better represent the displacement of (local) background scene elements that are occluded in the base frame.

9. The method of claim 8, in which the modified displacement vector associated with a break-induced inferred mesh element in a non-base frame, hereinafter known as the back-filled frame, is used to map the inferred mesh element back to the base frame, where it is added to the base displacement model as a new element, hereinafter known as a backfilled mesh element, representing scene content which is visible in the back-filled frame but occluded in the base frame.

10. The method of claim 7, where a base mesh augmentation step is performed whereby information from another coded mesh, hereinafter referred to as augmenting mesh, is used to augment the base mesh by backfilling mesh elements of the augmenting mesh that cover regions that disocclude when the base mesh is mapped to the location of the augmenting mesh.

11. The method of claim 10, whereby mesh elements of the augmenting mesh are sub-partitioned, and only those mesh elements that cover a disocclusion region are backfilled to the base frame.

12. The method of claim 9 in which backfilled mesh elements are assigned a local background layer index, based on the back-filled frame in which they are discovered, while elements of the original base mesh are considered to constitute a foreground layer, having layer index smaller than that of any backfilled mesh element, except for the break-induced mesh elements, which are assigned a layer index that is larger than that of any backfilled mesh element.

13. The method of claim 12, in which the determination of a reverse displacement field for each non-base frame includes the mapping of all base displacement vectors, including the backfilled mesh elements, to the non-base frame, and double mappings are resolved firstly in favour of the inferred mesh element produced by the base mesh element whose layer index is smallest, after which the method of claims 8, 9 and 11 is used to resolve any remaining double mappings resulting from intersecting inferred mesh elements with the same layer index.

14. The method of claim 12, in which the backfilling procedure is applied progressively, starting with the last frame of the GOP as the back-filled frame, adding the resulting backfilled mesh elements to the base displacement model with a first local background layer index, mapping all base mesh elements, including those of the first local background layer, to an intermediate frame of the GOP, applying the double mapping resolution procedure, identifying any break-induced mesh elements in the intermediate frame which have not been replaced by the double mapping resolution as infinity regions, applying the backfilling procedure to these infinity elements to produce new backfilled mesh elements in the base displacement model that are assigned the next larger local background layer index, mapping all elements of the base model to a second intermediate non-base frame in the GOP, and recursively applying the process, assigning the resulting backfilled mesh elements to local background layers with progressively larger layer indices.

15. A method for coding displacement fields within a video sequence comprising video frames, wherein the video frames are assigned to Groups of Pictures known as GOPs, the method comprising:
  coding a base displacement model for a GOP, the base displacement model describing a displacement that carries each location in a designated base frame of the GOP to a corresponding location in each other frame of the GOP, and other displacement relationships between the frames of the GOP are inferred from the base displacement model,
  wherein the base displacement model is described via a deformable base mesh whose nodes are assigned one displacement vector for each non-base frame in the GOP, and
  wherein breaks in the base displacement model are covered by a subset of elements of the base mesh, said subset of elements being break-induced mesh elements, said break-induced mesh elements being located between nodes, where the nodes of the break-induced mesh elements appear in co-located pairs, one node in each pair carrying displacement vectors associated with one side of the break, while the other carries said displacement vectors associated with the other side of the break.

16. A method for displacement compensated prediction of certain image frames from other frames, for frames in a video and/or Multiview sequence, wherein the frames are assigned to groups of pictures (GOPs), comprising:
  providing a base displacement model for each GOP, describing a displacement that carries each location in a designated base frame of a GOP to a corresponding location in each other frame of the GOP, said base displacement model being used to infer displacement relationships between the frames of the GOP, and the inferred displacement field at a prediction target frame being used to predict that frame from one or more other frames in the GOP,
  wherein the base displacement model is described via a deformable base mesh whose nodes are assigned one displacement vector for each non-base frame in the GOP, and
  wherein breaks in the base displacement model are covered by a subset of elements of the base mesh, said subset of elements being break-induced mesh elements, said break-induced mesh elements being located between nodes, where the nodes of the break-induced mesh elements appear in co-located pairs, one node in each pair carrying displacement vectors associated with one side of the break, while the other carries said displacement vectors associated with the other side of the break.

17. A coding apparatus, wherein the coding apparatus is arranged to implement the method for representing displacement information in accordance with claim 1.

18. A non-transitory, non-volatile computer readable medium providing a computer program, the computer program comprising instructions for controlling a computer to implement a method in accordance with claim 1.

* * * * *